United States Patent Office 3,461,325
Patented Aug. 12, 1969

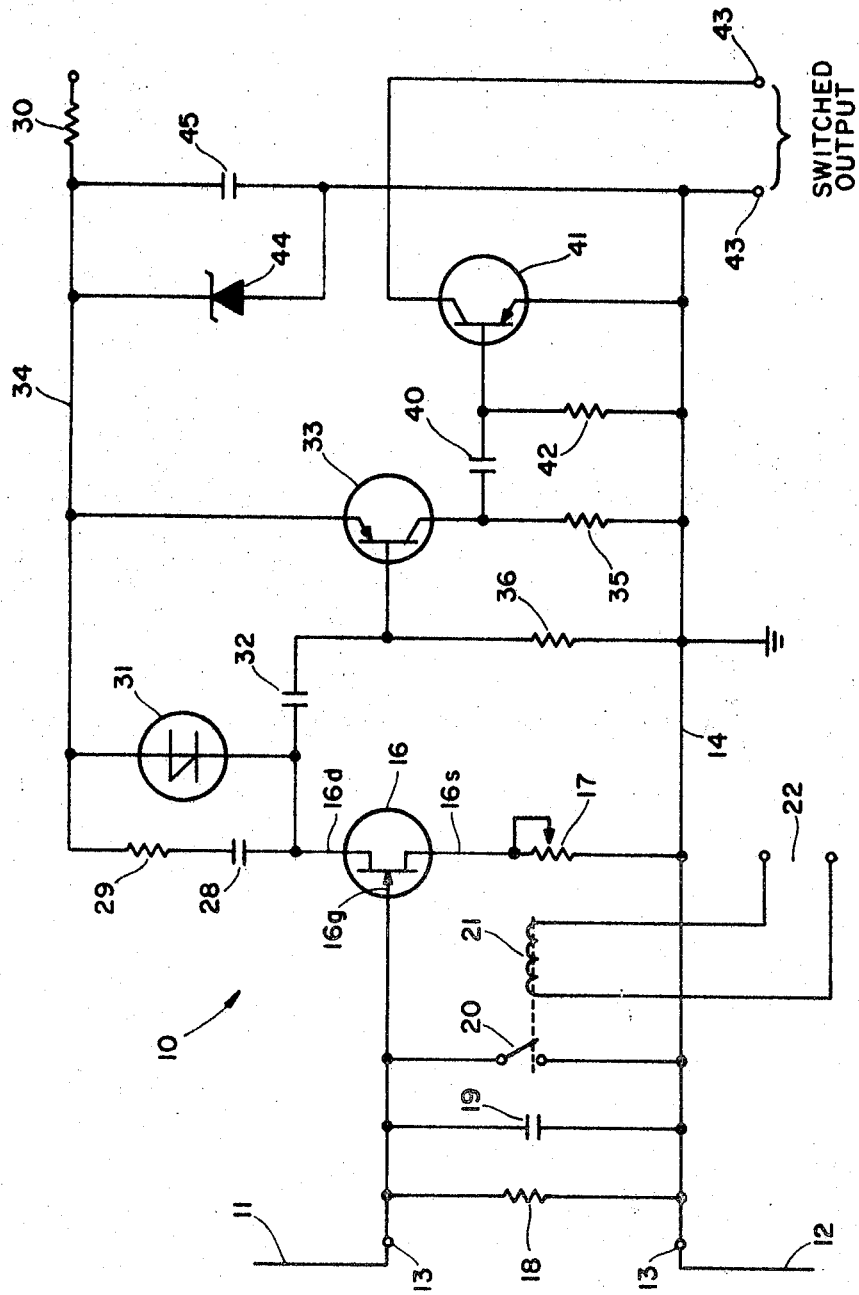

3,461,325
SWITCHING APPARATUS FOR MEASURING AN ATMOSPHERIC VARIABLE
Robert W. Barrett, Minneapolis, Minn., assignor to Litton Systems, Inc., Beverly Hills, Calif., a corporation of Maryland
Filed Dec. 7, 1966, Ser. No. 599,760
Int. Cl. H03k 3/26
U.S. Cl. 307—308
8 Claims

ABSTRACT OF THE DISCLOSURE

This measuring apparatus uses a dipole antenna to sense atmospheric air-earth currents and signals indicative of such currents are applied to an oscillating circuit including a field-effect transistor, an RC circuit, and a Shockley diode in combination with the RC circuit. The output from the oscillating circuit is applied through a buffer-amplifier stage to control the conductive state of a transistor used for switching purposes. An RC circuit is provided for reducing or eliminating the effect of unwanted displacement currents on the operation of the apparatus, and the overall circuit is comprised of components having relatively non-critical values to facilitate reproducibility of the apparatus. The apparatus described herein also can be used for measuring other variables such as, for example, atmospheric electrostatic potential.

---

This invention relates in general to measuring apparatus, and in particular, to a measuring apparatus of the type used for sensing air-earth currents.

It is well known that an electrostatic field exists between the earth and the atmosphere surrounding the earth. The presence of this electrostatic field gives rise to an electric current which flows between the atmosphere and the earth and which is commonly known as the "Air-earth current." The worldwide air-earth current has been estimated to total a fixed amount of approximately 1800 amperes. However, the local air-earth current density varies depending upon the particular location on the surface of the earth and upon other factors, and so it frequently becomes desirable to measure this local current for investigative purposes.

Apparatus for measuring the air-earth current is known in the prior art. For example, in U.S. Patent 3,121,196 to H. W. Kasemir, a dipole antenna of a design adequately disclosed therein is used, in conjunction with a radiosonde transmitter and a suitable lifting vehicle such as a balloon for transporting the apparatus upwardly into the atmosphere, for telemetering to a remote location air-earth current values sensed during the passage through the atmosphere.

It is evident that a measuring apparatus used for measuring air-earth current conditions must be relatively stable in operation and must be relatively unaffected by temperature variations and other factors which cannot readily or inexpensively be controlled in the environment of use to which such apparatus is exposed. Moreover, such a measuring apparatus should provide relatively stable operation within a reasonable range of power supply voltage fluctuation so as to minimize the battery or other power supply requirements which must be carried aloft with the apparatus. Finally, inasmuch as measuring apparatus used for atmospheric evaluation must be considered to be expendable items because the recovery of such apparatus after use cannot be assured, the quantity and cost of components used in the measuring apparatus must be chosen to minimize the replacement cost thereof.

Accordingly, it is an object of this invention to provide a new and improved measuring apparatus.

Another object of this invention is to provide a new and improved measuring apparatus particularly useful for the measurement of atmospheric air-earth currents.

A further object of this invention is to provide an atmospheric current measuring apparatus which has a relatively stable output under varying conditions of temperature and/or supply voltage.

A still further object of this invention is to provide an atmospheric current measuring apparatus which is relatively non-critical as to the selection of components utilized in the fabrication thereof.

Another object of this invention is to provide an atmospheric current measuring apparatus capable of being inexpensively fabricated.

According to the present invention there is provided an atmospheric air-earth current measuring apparatus designed to be used with a conventional dipole antenna of the type used for measurement of atmospheric currents and which provides an output adapted to key or modulate a conventional radiosonde. Solid state components are used in the circuitry of this invention, and adequate input signal isolation and amplification is provided through the unique circuitry described below to insure dependable and repeatable operation of the invention. The circuitry also provides effective separation of unwanted signals resulting from displacement currents.

The exact nature of this invention, as well as other objects and advantages thereof, will be readily apparent from consideration of the following specification relating to the annexed drawing in which:

The figure shows a schematic diagram of a measuring apparatus according to an embodiment of this invention.

Stated generally, the circuit of this embodiment provides a high impedance solid state device such as a field-effect transistor, herein abbreviated FET, to receive input signals from a suitable signal source such as a dipole antenna. The output of the FET is coupled to a suitable voltage-responsive discharge device such as a four-layer or Shockley diode. Triggering of the Shockley diode causes gating of a suitable semiconductor switching circuit into momentary conductivity, whereby a radiosonde blocking oscillator connected to such a switch is allowed to generate an output pulse.

More particularly, and with reference taken to the figure, there is shown a measuring apparatus indicated generally at 10 and connected to dipole antenna portions 11 and 12 through terminals 13. Antenna portion 12 is connected to common or ground line 14, while antenna portion 11 is connected to the gate electrode 16g of field-effect transistor 16. The source electrode 16s of FET 16 is connected to ground through a potentiometer 17, while resistance 18, capacitance 19, and switch 20 are all connected in parallel across antenna terminals 13 and, accordingly, across the gate-source circuit of the FET. Resistance 18 and capacitance 19 comprise an RC circuit for a purpose set forth below. Shorting switch 20 is operated by energizing coil 21 through application of a suitable voltage to terminals 22, also as described below.

The drain electrode 16d of FET 16 is connected to a series RC circuit including capacitance 28 and resistance 29. The other end of resistance 29 is connected to a positive potential line 34 and thence through resistance 30 to a suitable source of positive potential. A Shockley diode 31, sometimes referred to in the art as a four-layer diode, is connected in parallel across resistance 29 and capacitance 28.

The point of connection between FET 16 and capacitance 28 also is connected through coupling capacitance 32 to the base of transistor 33. The emitter of transistor 33 is connected directly to positive potential line 34 while the collector electrode of this transistor is connected to ground through resistance 35. A return to ground for the base electrode of transistor 33 is provided through resistance 36.

Output from the stage using transistor 33 is taken across resistance 35 and coupled through capacitance 40 for application to the base of a second transistor 41. Base return of transistor 41 to ground is provided by resistance 42, and the emitter and collector electrodes of this transistor are connected directly to output terminals 43 to provide a switching function for a suitable circuit connected to these terminals.

A Zener diode 44 and a capacitance 45 are connected across the positive potential line 34 and the ground line 14 to provide voltage regulation.

In the operation of the circuitry described herein, it is assumed that the dipole antenna connected to terminals 13 is positioned substantially vertically with respect to the earth's surface and that this antenna, along with the remainder of the measuring apparatus and a radiosonde or other suitable telemetry apparatus, is being borne upwardly through a portion of the earth's atmosphere by a suitable lifting device such as a balloon or the like. Alternatively, the antenna and associated apparatus could be descending through the atmosphere as a payload to a parachute. The details of this aspect of atmospheric current measurement are believed obvious to those of ordinary skill in the art and are described more fully in the above-mentioned Patent No. 3,121,196. Accordingly, no further description thereof is contained in this discussion.

During traversing of this apparatus through the earth's atmosphere at least two different types of air-earth current conditions may be encountered. A first type of such condition is the relatively steady-state or long-term air-earth current flowing through the atmosphere, the measurement of which is sought by the apparatus of this invention. Another type of such condition is a relatively short-term current fluctuation caused by atmospheric or other occurrences prevelant in the lower atmosphere near the earth's surface, such occurrences being exemplified by clouds, air turbulence, and the like. These short-term fluctuations, sometimes known as displacement currents, in the air-earth current may have a period, e.g., of 30 seconds or less, and the presence of such short-term fluctuations when superimposed upon the long-term earth current undergoing investigation provide an unwanted and erroneous indication of air-earth current fluctuation.

The effect of displacement currents is minimized or reduced through proper selection of the values of resistance 18 and capacitance 19 so that the time constant of the RC circuit thereby provided effectively shunts around FET 16, the unwanted signals produced by the displacement currents while providing little or no shunting effect to the signals corresponding to the desired air-earth currents. As an example of appropriate component values and without intent to limit, resistance 18 may be 10,000 megohms and capacitance 19 may be 0.003 mfd. to provide a time constant of 30 seconds.

FET 16, Shockley diode 31, and the RC circuit including capacitance 28 and resistance 29 all taken together comprise an oscillating circuit the operating frequency of which is dependent upon the current flowing to capacitance 28 and, accordingly, upon the signal applied to the gate electrode 16g of the FET. The FET 16 is connected as a source follower and potentiometer 17 is adjusted initially to establish an FET operating point which minimizes the temperature drift of current through the FET or, if required, which effectively minimizes the temperature drift of the entire measuring apparatus disclosed herein. The FET 16 thus functions substantially as a constant current device for a given signal applied to the gate electrode thereof, since the no-signal drain voltage is well above the pinch-off voltage of the FET.

Current passing through FET 16 builds up a charge on capacitance 28 reaches the firing voltage of Shockley diode substantially non-conductive. When the voltage across capacitance 28 reaches the firing voltage of Shockley diode 31, this diode then becomes a device of substantially low impedance and the capacitance discharges through the diode until the current passing from the capacitance through the diode drops to a level wherein the diode again assumes a relatively high impedance value. Upon each firing of the Shocklye diode 31 the resulting sudden voltage change on capacitance 28 is coupled through capacitance 32 to the input of transistor 33, thereby providing an input to this transistor comprising a pulse wave form the frequency of which is dependent upon the signal applied to the gate of FET 16.

Transistor 33 functions in the conventional manner according to the input from the preceding stage to provide an output across resistance 35 consisting of a sharp negative pulse in response to firing of Shockley diode 31. This output pulse is coupled through capacitance 40 to the collector of switching transistor 41, and this transistor may be coupled directly to the grid of the blocking oscillator in the radiosonde or to any other suitable telemetry device being controlled by this measuring apparatus, whereby keying at a rate dependent on the input signal to FET 16 is accomplished.

Component values associated with FET 16, resistance 29, capacitance 28, and Shoukley diode 31 are chosen to provide a no-signal oscillation frequency of, for example, 100 c.p.s. Maintenance of this "zero" frequency can conveniently be checked during operation of the apparatus by closing relay-actuated switch 20, whereupon the input to FET 16 is grounded and the no-signal frequency prevails. With the switch 20 open, atmospheric currents sensed by portions 11 and 12 of the dipole antenna, if these currents are of the proper period, are applied to the input of FET 16 and cause corresponding changes in the frequency of operation of this circuit and thus of switching transistor 41. This causes a corresponding change in the pulsing rate of the radiosonde or other telemetry device, whereupon the magnitude of the air-earth currents giving rise to the operating frequency can be determined at a position located remotely from the apparatus.

Since the FET 16 as used in the apparatus of this invention is substantially a constant-current device and since operation of the Shockley diode 31 is dependent primarily upon the voltage charge developed across capacitance 28, the proper and linear operation of the measuring apparatus disclosed herein is relatively unaffected by changes in the ambinet temperature. The use of these components in a triggering or switching type of circuit, along with the use of transistor 33 as a driver stage for switching transistor 41, provides an air-earth current measuring apparatus the operation of which is relatively independent of variations in the characteristics of individual components from the nominal characteristics of such component, thus rendering the apparatus of the present invention amenable to assembly on a production basis. Since this measuring apparatus contains relatively few components and components of an inexpensive nature, no great loss is incurred if the apparatus is lost or irreparably damaged in use.

Although the apparatus of this invention has been described in the context of air-earth current measurement, this apparatus is equally useful in other applications where an atmospheric or non-atmospheric variable is to be converted to a signal the pulse repetition rate of which is a function of the variable. By way of illustration only, this apparatus when provided with an appropriate antenna can be used to measure electrostatic potentials in the atmosphere of the earth. As is known to those skilled in the art, substitution for dipole portions 11 and 12 of a high-impedance antenna having an associated radiation source causes to be present at terminals 13 a signal indicative of the atmospheric electrostatic field potential at the location of the antenna; this signal controls the current flowing through FET 16 to vary the switching rate in the manner described above.

It should be understood, of course, that the foregoing relates to only a preferred embodiment of the invention and that numerous modifications or alterations may be made therein without departing from the spirit and the scope of the invention as set forth in the appended claims.

What is claimed is:

1. A signal responsive switching circuit comprising:
    a field effect transistor having the gate electrode thereof connected to be responsive to an input signal;
    capacitance means connected in circuit with said field effect transistor so that controlled current flowing through said field effect transistor also flows at least in part through said capacitance means;
    a Shockley diode connected in parallel with said capacitance means;
    the polarity of said diode with respect to said capacitance means being chosen such that said diode is substantially non-conductive until the voltage across said capacitance means reach a first predetermined level, whereupon said diode is rendered substantially conductive to permit discharge of said capacitance means until the current flowing through said diode reaches a predetermined level whereat said diode is again rendered substantially non-conductive; and
    switch means responsive to the occurrence of said discharge of said capacitance means to be rendered alternately substantially conductive and substantially non-conductive as a function of said occurrence of discharge so that the operation of an output circuit including said switch means is controlled as a function of the input signal.

2. Apparatus as in claim 1, further comprising:
    second circuit active means connected to be responsive to the discharge of said capacitance means to produce an output pulse indicating the occurrence of conduction through said Shockley diode; and
    circuit means supplying said output pulse of said second circuit active means to said switch means so that said output pulse determines the conductive state of said switch means.

3. Apparatus for sensing atmospheric current flow, comprising:
    antenna means for producing a signal responsive to the atmospheric air-earth current flowing in the vicinity of an atmospheric region in which said antenna means is disposed;
    a circuit active element connected to be responsive to said signal produced by said antenna means, the current flowing through said circuit active element being a function of said signal;
    capacitance means connected in circuit with said circuit active element to receive a charging current which is a function of the current flowing through said circuit active element;
    discharge means connected to be subjected to the charge on said capacitance means, said discharge means being in a substantially non-conductive state until the charge on said capacitance means reaches a first predetermined level and then becoming substantially conductive to permit discharge of said capacitance means to a point whereat said discharge means again assumes the substantially nonconductive state; and
    switch means connected to be responsive to the occurrence of said discharge of said capacitance means to enable a circuit including said switch means to be controlled as a function of said signal produced by said antenna means.

4. Apparatus as in claim 5, further comprising:
    resistance-capacitance means connected in circuit with the input to said circuit active means, the component values of said resistance-capacitance means being chosen to provide a time constant permitting passage from said antenna means to said circuit active means of signals resulting from atmospheric currents undergoing examination while preventing passage of signals resulting from unwanted relatively short period atmospheric displacement currents.

5. Apparatus as in claim 4, wherein:
    said resistance-capacitance means includes a resistance and a capacitance connected in shunt with respect to said input of said circuit active means; and
    the time constant of said resistance-capacitance means is not less than about 30 seconds.

6. Apparatus as in claim 5, wherein:
    said discharge means comprises a Shockley diode connected in parallel with said capacitance means.

7. Apparatus as in claim 6, wherein:
    said circuit active means comprises a field effect transistor having the gate electrode thereof connected to be responsive to the signal produced by said antenna means;
    said field effect transistor and said capacitance means being connected in series so that controlled current flow through said field effect transistor provides the charging current for said capacitance means.

8. Apparatus as in claim 7, further comprising:
    resistance-capacitance means connected in shunt with the signal input of said field effect transistor, the time constant of said resistance-capacitance means being chosen to prevent application to said field effect transistor of signals resulting from unwanted relatively short period atmospheric displacement currents while permitting passage of signals resulting from relatively long term atmospheric currents undergoing exmaination.

References Cited

UNITED STATES PATENTS

| 2,845,548 | 7/1958 | Sillman et al. | 307—293 X |
| 2,892,101 | 6/1959 | Bright | 307—293 X |
| 2,970,228 | 1/1961 | White et al. | 307—293 |
| 3,048,710 | 8/1962 | Shockley | 307—228 |

JOHN S. HEYMAN, Primary Examiner

U.S. Cl. X.R.

73—170; 307—233, 235, 246, 251, 258, 293

UNITED STATES PATENT OFFICE
CERTIFICATE OF CORRECTION

Patent No. 3,461,325              Dated August 12, 1969

Inventor(s) R. W. BARRETT

It is certified that error appears in the above-identified patent and that said Letters Patent are hereby corrected as shown below:

In the specification, Column 4, Line 2, after the number 28 delete "reaches the firing voltage of" and insert therefor --since--.

In the specification, Column 4, Line 2, after the word diode insert --31 is at this time--.

In the claims, Column 6, Line 11, after the word claim delete "5" and insert therefor --3--.

In the claims, Column 6, Line 27, after the word claim delete "5" and insert therefor --3--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents